United States Patent
Desmicht et al.

(10) Patent No.: US 8,266,444 B2
(45) Date of Patent: Sep. 11, 2012

(54) CHIP INTEGRATED PROTECTION MEANS

(75) Inventors: Eric Desmicht, Caen (FR); Stéphane Mutz, Caen (FR); Christophe Tison, Douvres la Delivrande (FR)

(73) Assignee: Entropic Communications, Inc., San Diego, CA (US)

( * ) Notice: Subject to any disclaimer, the term of this patent is extended or adjusted under 35 U.S.C. 154(b) by 1108 days.

(21) Appl. No.: 10/536,732

(22) PCT Filed: Nov. 11, 2003

(86) PCT No.: PCT/IB03/05094
§ 371 (c)(1), (2), (4) Date: May 27, 2005

(87) PCT Pub. No.: WO2004/049141
PCT Pub. Date: Jun. 10, 2004

(65) Prior Publication Data
US 2006/0156033 A1 Jul. 13, 2006

(30) Foreign Application Priority Data
Nov. 27, 2002 (EP) .................................... 02292935

(51) Int. Cl.
*G06F 21/00* (2006.01)
*H04N 7/167* (2011.01)
(52) U.S. Cl. .................. 713/189; 726/27; 380/239
(58) Field of Classification Search .............. 713/193, 713/194, 162, 165, 167, 183, 182; 726/26, 726/27, 28, 29, 30; 711/101, 103, 104, 163, 711/164, 145
See application file for complete search history.

(56) References Cited

U.S. PATENT DOCUMENTS

| 5,101,121 | A | * | 3/1992 | Sourgen ........................... 326/8 |
| 5,293,610 | A | | 3/1994 | Schwarz |
| 5,530,753 | A | | 6/1996 | Easter et al. |
| 5,826,007 | A | * | 10/1998 | Sakaki et al. ................... 714/42 |
| 5,933,620 | A | | 8/1999 | MacDonald et al. |
| 6,016,348 | A | | 1/2000 | Blatter et al. |
| 6,118,870 | A | * | 9/2000 | Boyle et al. ................... 380/201 |
| 6,160,734 | A | | 12/2000 | Henderson et al. |
| 6,182,205 | B1 | * | 1/2001 | Le Roux et al. ................ 712/38 |
| 6,317,849 | B1 | | 11/2001 | Patel |

(Continued)

FOREIGN PATENT DOCUMENTS
CN 1301111 6/2001
(Continued)

OTHER PUBLICATIONS

Office Action Summary regarding the related Japanese Patent Application No. 2004-554764.

(Continued)

*Primary Examiner* — Gilberto Barron, Jr.
*Assistant Examiner* — Izunna Okeke
(74) *Attorney, Agent, or Firm* — Duane Morris LLP (57) ABSTRACT

The invention relates to a chip for processing a content, comprising at least a microprocessor. Said chip includes an integrated non-volatile programmable memory for storing protection data and protected data, said protection data being intended to be used for authorizing/denying access to said protected data by said microprocessor under execution of a program. The invention allows to protect program and data dedicated to a chip-integrated conditional-access system and to protect features as external connections and downloaded data directly on the chip.

17 Claims, 2 Drawing Sheets

U.S. PATENT DOCUMENTS

| | | | |
|---|---|---|---|
| 6,453,397 | B1 | 9/2002 | Okuda |
| 6,731,536 | B1 * | 5/2004 | McClain et al. .......... 365/185.04 |
| 7,000,115 | B2 * | 2/2006 | Lewis et al. ................... 713/176 |
| 7,305,534 | B2 * | 12/2007 | Watt et al. ..................... 711/163 |
| 2001/0013021 | A1 | 8/2001 | Saito |
| 2001/0013121 | A1 | 8/2001 | Kimball et al. |
| 2003/0014653 | A1 * | 1/2003 | Moller et al. ................. 713/193 |
| 2003/0115472 | A1 * | 6/2003 | Chang .......................... 713/182 |
| 2005/0033951 | A1 * | 2/2005 | Madter et al. ..................... 713/2 |

FOREIGN PATENT DOCUMENTS

| | | |
|---|---|---|
| EP | 0834882 A2 | 4/1998 |
| EP | 1063589 A | 12/2000 |
| EP | 1094393 A | 4/2001 |
| EP | 1150506 A2 | 10/2001 |
| EP | 1150606 A3 | 1/2003 |
| JP | 58208999 A | 12/1983 |
| JP | 63056749 A | 3/1988 |
| JP | 63206852 A | 8/1988 |
| JP | 01-219982 | 9/1989 |
| JP | 2000181898 A | 6/2000 |
| JP | 2000339152 A | 12/2000 |
| WO | WO 02/06931 A2 | 1/2002 |

OTHER PUBLICATIONS

Article de TeleSatellite "Un Nouveau Cryptage Pour Canalsatellite", La revue de presse Philips France; Jan. 10, 2002, pp. 1-2.

Prosecution for counterpart EP Application No. 03769791.9 (EP 1570330 A2, published Sep. 7, 2005), as downloaded from the European Register on Oct. 26, 2011, 262 pages.

International Search Report of the International Search Authority; dated Jul. 15, 2004, in the corresponding PCT application PCT/IB2003/005094 (WO2004/049141), 5 pages.

Japanese Office Action dated Apr. 6, 2010, 4 pages, (English summary previously submitted and considered by Examiner).

* cited by examiner

CHIP INTEGRATED PROTECTION MEANS

CROSS-REFERENCE TO RELATED APPLICATION(S)

This 371 application claims benefit/priority of PCT International Application PCT/IB2003/05094, filed Nov. 11, 2003, and claims priority to European Application No. 02292935.0, filed Nov. 27, 2002.

FIELD OF THE INVENTION

This invention relates to a chip for processing content, comprising at least a microprocessor. The invention particularly relates to chips intended to be embedded in devices designed to recover from a media a content to be protected. The invention also relates to a device wherein such a chip is embedded. The invention also relates to a method to protect such a chip according to the invention.

BACKGROUND OF THE INVENTION

In known devices dedicated to a content processing, said content needing to be protected, security of said content is generally controlled by means external to the chip that process the content, called main chip in the following. Such external security means include smart card systems as, for example, described in document EP1150506. The advantage of such external security means is that they provide a good flexibility of the protection of the device.

Nevertheless, in this document, the chip that includes the content processing means, and consequently the core of the system, is not protected by itself. Connectors intended to be used to connect external elements like, for example, a bus for testing the chip, can serve to take control of the content processing means. Thus, the processed content is accessible and is no more protected. Moreover, separation between main chip and security elements implies that communications between the two can be eavesdropped. Moreover, security means proposed in the state of the art are expensive and require supplementary manufacturing steps to be implemented in devices.

SUMMARY OF THE INVENTION

It is an object of the present invention to solve all the above-mentioned drawbacks. It is another object of the invention to propose low-price secured devices.

A chip according to the invention includes an integrated non-volatile programmable memory for storing protection data and protected data, said protection data being intended to be used for authorizing/denying access to said protected data by said microprocessor while a program is executed.

The insertion of such a non-volatile programmable memory in the chip that includes the processing means allows to provide an integrated protection for different features of said chip. An access by said microprocessor can be in writing or reading. The invention enables flexible security means to be implemented in a very simple and low cost direct way in a main chip. In a first embodiment, protected data define features of said chip and said microprocessor is authorized or not to access said protected data in writing or in reading. For example, such a feature can be a connection to external elements like, for example, a bus for testing the chip. The invention then allows to avoid that such a connection serves to take control of the microprocessor. The microprocessor requiring an access to protected data has a program that makes it check if protection data authorize or deny said access. If several microprocessors are present in said chip, each of them has its own protection data for its own access to protected data. As protection may provide different kinds of protection and protected data may correspond to several kinds of feature for said chip, the invention then allows a great diversity of protections. In the following, several embodiments are proposed according to the principles of the invention.

Advantageously, protection data are only modifiable increase protection. Thus, it is no longer possible to access a protected data as soon as protection data has been modified in order to deny this.

According to a first embodiment of the invention, each value that can be adopted by said protection data has a specific meaning for the program of said microprocessor: access to given protected data authorized or denied or authorized under condition. Thus, an advantageous implementation proposes that protection data include a password, said access being authorized/denied through a password check.

The first embodiment can be used for protected data including data to activate/deactivate optional features of the chip. Such an optional feature can be a connection intended to be connected to an external device for downloading program and/or data from said external device. Such an optional feature can be an external boot program for said microprocessor, said external boot program including instructions for downloading a new boot program for said microprocessor from an external memory. Such optional feature can be any feature that can be advantageously activated/deactivated in a chip. Consequently, this first embodiment enables the customization of features of the chip.

According to a second embodiment of the invention, protection data include a value defining an address limit, under which address limit of said non-volatile memory stored data are protected data and access to such protected data is denied. In this embodiment, protection data constitute a limit for the program of said microprocessor to which access is denied. Advantageously, protection can only be increased and said value is then only modifiable to be increased.

In an application of this second embodiment, protected data include programs and data dedicated to the functioning of a conditional-access dedicated microprocessor. Said conditional-access dedicated microprocessor is intended to interact with security data present in the content processed by said chip as known in the state of the art. Consequently, principles according to the invention allow the implementation of security means in the main chip by allowing the protection of program and data in the main chip itself. Such security means can be similar to the ones present on smart card chips.

Any downloaded program and data of several kinds: boot program, conditional-access program . . . can also be protected according to this second advantageous embodiment.

The invention then enables such a chip to be protected as hackers would not be able to listen in on communications between said microprocessor and security elements present on the chip as these security elements will be implemented in the chip itself.

The invention also relates to a device intended to recover a content from a media and to process said content, said device including a connection to said media and a chip as described hereinabove. Advantageously, said device is intended to process encrypted video/audio data.

The invention also relates to a method for obtaining a protected chip including at least a microprocessor, said method using a chip including at least an integrated non-volatile programmable memory, called non-volatile memory, said non-volatile memory including protection data, said protection data being intended to be used for authorizing/denying access to protected data in said non-volatile memory by said microprocessor under the execution of a program, said method including the steps of:

using at least an authorized access to modify protected data in said non-volatile memory, protecting the access to said protected data in said non-volatile memory by modifying protection data in order to deny said access.

BRIEF DESCRIPTION OF THE DRAWINGS

The invention is described hereafter in detail with reference to the diagrammatic Figures wherein.

DESCRIPTION OF EMBODIMENTS

Figure 1A:
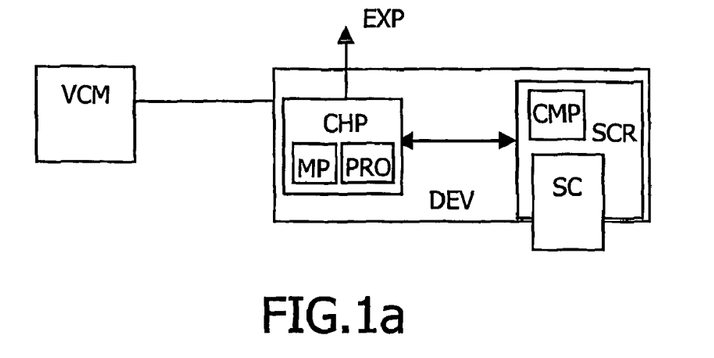
FIGS. 1a and 1b illustrate devices according to the state of the art.

FIG. 1a shows a device DEV according to the state of the art. Such a device DEV is intended to recover a content from a media VCM. Said content can be a received signal, data from a disc . . . Said media can be a network (satellite, terrestrial, cable, wireless . . . ), a DVD, Flash Cards, the hard disk of personal video recorders . . . Said device can be a Set Top Box, a TV receiver, a DVD player, a connected home server, a portable audio player, a mobile phone . . .

Said device DEV includes at least a chip CHP including at least a microprocessor MP with a program PRO to process content recovered from said media VCM. Generally, processed content is then transmitted to exploitation means EXP. These exploitation means EXP enable, for example, the display of processed data as images. Said exploitation means EXP may be included in said device or be external to said device, which does not make any difference.

In the state of the art, said device DEV includes generally a security-dedicated part implemented as a conditional access system detached from said chip CHP. In the example presented in FIG. 1, such a conditional access system is represented by a smart card reader SCR able to read a smart card SC with the help of a microprocessor CMP.

Figure 1B:
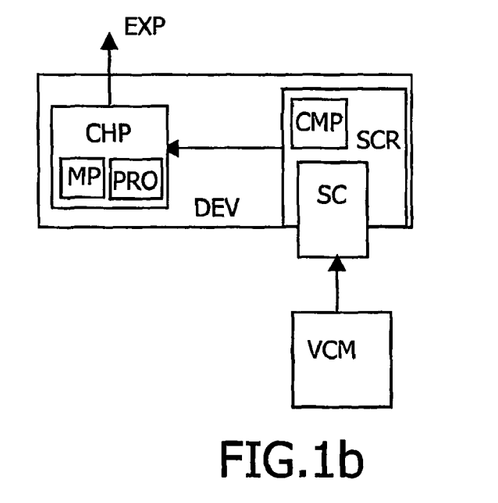
Figure 2:
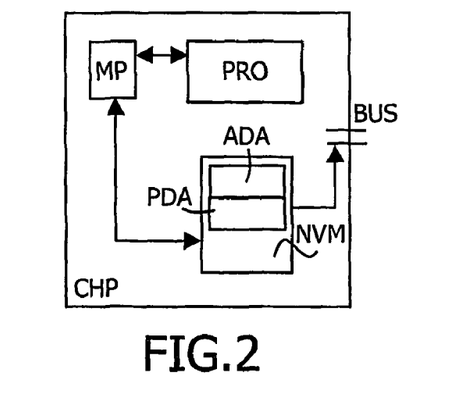
FIG. 2 illustrates a chip according to the invention.

FIG. 1b shows another implementation according to the state of the art: a removable security module SCR is plugged into the device as a security-dedicated part. It receives scrambled content from the media VCM, deciphers them and then sends them to content processing means. In the state of the art, the main chip CHP including processing means is sold to be implemented in said device DEV without any integrated protection. In this general case, data received and controlled by security-dedicated part need to be sent to an unprotected main chip. Such communications can be listened in on via, for example, a bus serving to test the chip CHP. Moreover, such bus can take the control of any microprocessor implemented on said main chip CHP. Security of the system is then no more ensured. This is a crucial problem when content that needs to be protected is processed in the chip CHP. The purpose of the invention is to enable such a chip CHP to have integrated protection. According to FIG. 2, the invention proposes that the chip CHP includes at least an integrated non-volatile programmable memory, called non-volatile memory NVM, said non-volatile memory NVM including protection data ADA and protected data PDA, said protection data being intended to be used for authorizing/denying access to said protected data PDA by said microprocessor MP under the execution of a program PRO.

Figure 3:
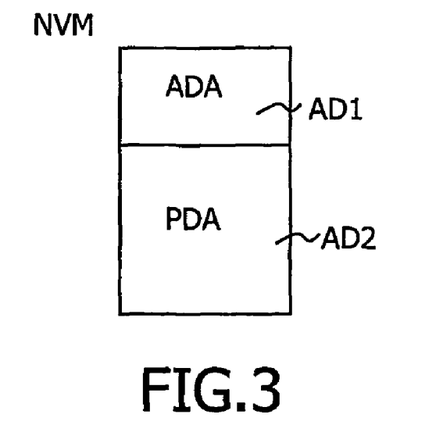
FIG. 3 illustrates a schematic programmable non-volatile memory according to the invention.

FIG. 3 illustrates the principle of a content of a non-volatile memory according to the invention.

Said programmable non-volatile memory can be a flash memory, programmable read-only memory (PROM), non-volatile random access memory (NVRAM), magnetic random access memory (MRAM, one-time programmable memory . . . The non-volatile memory shown in FIG. 3 can be an independent programmable non-volatile memory or a part of a partitioned programmable non-volatile memory. A single memory as presented in FIG. 3 can implement several embodiments according to the invention and presented below or can be dedicated to implement a single embodiment.

According to principles of the invention, protection data ADA are stored at a first address AD 1 of a non-volatile memory NVM. Said protection data ADA then protect an access to an address AD2 including protected data PDA in said non-volatile memory NVM. Said access can be in reading or in writing or both, as will be shown in the following.

Several embodiments using protection data and protected data according to the invention are proposed in the following Figures and tables. These embodiments are given to enable a man skilled in the art to understand, reproduce and use the invention but other kinds of protection data and of protected data at the different addresses can be modified while staying within the scope of the invention.

Examples of Protection Data ADA:

In a first embodiment, each value that can be adopted by said protection data PDA has a specific meaning for the program PRO of said microprocessor MP: access to given protected data PDA stored at an address or several addresses AD2, known by said program PRO, authorized or denied or conditionally authorized.

In a first simple implementation of the protection data according to this first embodiment, the protection data stored at an address AD1 can adopt two values: 0 and 1. For example, 0 corresponds to authorized access and 1 to non-authorized access.

| Address AD1 | Values | Name of protection data |
|---|---|---|
| 1 bit: | 0/1 | ACCESS_CONTROL |

Thus, if the value is 0, the access to address(es) AD2 is available. In this case, if the value is 1, the access is refused. The address AD2 is then secured. Advantageously, the protection can only be increased. In this example it means that the ACCESS_CONTROL bit can only be set from 0 to 1. Naturally it is also possible according to the invention to allow access to address AD2 for a bit set to 1 and to forbid such access for a bit set to 0. Each access is defined as being in writing, in reading or both and is defined relative to one or several given addresses AD2. Several examples of protected data PDA (data, program, options . . . ) in address AD2 will be given in the following.

An advantageous implementation of protection data PDA uses a password check. It allows an intermediate manufacturer (like a final device manufacturer or a broadcaster) to keep the possibility to access some data and/or program or options with a first level of protection against piracy using password. In this case protection data are coded with two bits.

An example of such an implementation is given in the table below:

| Address AD1 | Values | Name of protection data |
|---|---|---|
| 2 bits: | 0:0/0:1/1:X | ACCESS_CONTROL |
| Y bits: | | SAVED_PASSWORD |

In such an embodiment with a password control, the ACCESS_CONTROL bits are used to define a protection level: authorized access or not.

If value 0:0, accesses to data stored at addresses AD2 are authorized, said addresses AD2 and then said non-volatile memory and consequently said chip are unprotected. It is possible to read and write the Y bits of SAVED_PASSWORD.

If value=0:1, the non-volatile memory and then the chip are protected by a password. It is no more possible to read or write the Y-bits SAVED_PASSWORD. To realize the password control, the non-volatile memory is for example connected to a register of Y-bits. It is possible to write a password of Y-bits ENTERED_PASSWORD in this register. This password is then compared with the password saved in the non-volatile memory at an address AD1 named SAVED_PASSWORD. This comparison can use simple random logic consisting of simple inverters, AND gates, and OR gates.

Two Cases are then Possible:

The password written in the register is correct, which means that ENTERED_PASSWORD and SAVED_PASSWORD are identical. Accesses to data stored at addresses AD2 are authorized, which means that the non-volatile memory is in a non-protected mode.

The password written in the register is not correct. Accesses to data stored at addresses AD2 are not authorized, which means that the non-volatile memory is in a protected mode.

Said address SAVED_PASSWORD can be read or written as long as the non-volatile memory is in an unprotected mode and can be neither read nor written as soon as the chip is protected by password or by hardware.

If value=1:X, X being 0 or 1, the access to addresses AD2 is protected by hardware.

Again, the protection level can only be raised, never decreased. It is then not possible to go from 1:X to 0:X or from 0:1 to 0:0. Such a feature is realized using a one-way state machine. A state machine defines effectively different states that can be adopted in a given and fixed order. States can be ordered to realize a loop: once the last state of a list of states is reached, the first state of the list is the following state or states can be ordered in an open way. In this case, a one-way state machine is obtained as it is only allowed to respect a given order within states and once the last state has been reached it is no longer possible to change the state.

In a second embodiment, a protection data ADA stored at an address AD1 defines an address limit under which access to said non-volatile memory NVM is forbidden, said protection data being modifiable only to be increased. It is recalled that said access can again be defined in writing, in reading or in both for a given microprocessor. For example, the address AD1 filled last of the non-volatile memory NVM contains a value named READ_AND_WRITE_LIMIT as protection data ADA. All addresses AD2 smaller than this value READ_AND_WRITE_LIMIT can be neither read nor written by a microprocessor MP. Protected data PDA are defined by any data stored at addresses smaller than this value READ_AND_WRITE_LIMIT. All addresses greater than this value can be read or written by said microprocessor. The value stored at AD1 can be read. It can also be written, but only if the new value is greater than the old one. By the way, the protection can only be increased as the address limit READ_AND_WRITE_LIMIT can only be increased.

In another example, the last address AD1 of the non-volatile memory NVM contains a reading limit READ_LIMIT and/or a writing limit WRITE_LIMIT. All addresses smaller than READ_LIMIT cannot be read by said microprocessor. All addresses equal to or greater than this value can be read by said microprocessor. All addresses smaller than WRITE_LIMIT cannot be written by said microprocessor. All addresses greater than this value can be written by said microprocessor.

READ_LIMIT and WRITE_LIMIT can be read and can be modified by a microprocessor but only if the new values are greater than the old ones. Thus the protection level can only be increased and the portion of the non-volatile memory NVM that is protected becomes ever larger. In this second embodiment, addresses for which access is controlled are the addresses AD2 that are smaller than the value stored at AD1.

Examples of Protected Data PDA in Non-volatile Memory:

As seen hereinabove, the protection data at addresses AD1 aims to protect an access for writing and/or for reading to others addresses AD2 of the non-volatile programmable memory NVM for a given microprocessor. Protected data PDA are stored at said addresses AD2. Below, examples of protected data PDA that can be stored at protected address AD2 will be presented.

A first kind of protected data PDA can be a feature data that defines the state of a feature of the chip CHP. Here generally the access controlled by said protection data ADA stored at an address AD1 is an access in writing by a microprocessor at address AD2. The microprocessor can read the feature data but its access in writing is authorized or not by protection data ADA.

The feature can be an option implemented on said chip CHP and the feature data consequently either or not gives the authorization to use the option. Examples of such options are the ones that are generally implemented under the condition of a payment of a license. For example, SECAM, MACROVISION, ICAM, CCIR_OUTPUT are such kind of options. Means to realize such options can then be implemented in all chips during manufacturing and their use can be enabled or disabled afterwards by implementing protection levels controlled by protection data ADA as proposed by the invention. The implementation of all means to realize these options in all chips and the final customization according to the choice of the manufacturer of the final device or of the broadcaster allow to realize cost saving regarding the development and manufacture of said chip. As a matter of fact a single version of the chip can be prepared. The chips are customized at a final production stage. This flexibility is original. In the table below are represented four addresses AD2 storing protected data PDA serving for the selection of options named in the third column by taking the values in the second column.

| Address AD2 | Values | Name of feature |
|---|---|---|
| 1 bit: | 0/1 | ENABLE_SECAM |
| 1 bit: | 0/1 | ENABLE_MACROVISION |
| 1 bit: | 0/1 | ENABLE_ICAM |
| 1 bit: | 0/1 | ENABLE_CCIR_OUTPUT |

According to the value of the bit for each of the four addresses AD2, the CCIR_OUTPUT feature can either or not be rendered available, the ICAM feature can either or not be enabled, the processing means implemented on chip CHP can either or not add MACROVISION copy protection on an output of processing means, the processing means implemented on chip CHP can either or not produce SECAM output. Then the access for changing these values is authorized or not by corresponding protection data ADA stored at an address AD1.

The control of options is then offered under the control of protection data ADA as presented in said first embodiment of the invention. Preferably, a single bit of protection data ADA stored at an address AD1 protects the set of options. Nevertheless, several protection data ADA stored at addresses AD1 can also protect separately each of the above-presented addresses AD2.

The feature protected by protection data ADA can be any means allowing an external connection of the chip CHP. The invention allows enabling and disabling such means by feature data controlling their states: active or not. Such means are presented below.

Boot Mode of a Microprocessor:

Thanks to the invention, a microprocessor can have a small program called first boot mode stored at a small part of any memory on the chip to realize its first boot from an external memory. For example, an EEPROM external to the chip and/or external to the final device (if the chip is already used in such a device) can be used as external memory. The broadcaster can then download from this external memory a new boot program that can be customized at will. The activation of said internal or external first boot mode internal or external is performed by the microprocessor by reading an address AD2 where a feature data is stored (see example and table hereinafter). Effectively, the invention allows disabling or enabling the activation of the first boot mode to download a boot program by the modification of a protected data PDA stored at an address AD2 defining the boot mode (external or internal). Protection data ADA as defined in the first embodiment of the invention stored at an address AD1 then control the access in writing in protected feature data ADA defining the boot mode. Once such activation of the first boot mode is disabled by change of address AD2 from 'external boot' to 'internal boot', and once the access for writing at address AD2 is non-authorized by protection data ADA at an address AD1 according to one of the cited embodiments, the access for writing at address AD2 is no more possible and the 'external' boot mode is no longer possible. The boot is then realized from a memory in the chip where the new boot program has been stored.

Connections Allowing Access to the Inside of the Chip:

Connections of said chip to external sources can be disabled according to the invention. JTAG, EJTAG, debug interfaces can allow an external user to control or listen in on the internal operation of the chip and the invention is particularly interesting for such features. The state (active or not active) of such a feature is defined by a protected data PDA stored at an address AD2 (see table hereinafter). The access for writing at this address AD2 is controlled by protection data ADA according to the first embodiment of the invention.

This is a new function regarding the state of the art where these connections, mainly used for manufacturing or debugging issues are generally physically suppressed for security reasons causing inherent drawbacks concerning, in particular, the test of the chip. The invention allows to keep such connections for testing the chip and/or the device, and then to disable it in a non-reversible way. This disabling can be realized by simple programming and until the commercialization of the final device.

Authorization to Write in Program and Data for the Operation of the Microprocessor:

The writing at addresses of said non-volatile memory NVM can also be forbidden by storing at an address AD2 a value READ_ONLY as a protected data PDA under which addresses cannot be written. Said value READ_ONLY can be modified as long as corresponding protection data ADA allow the access to modify said protected data PDA.

Figure 4:
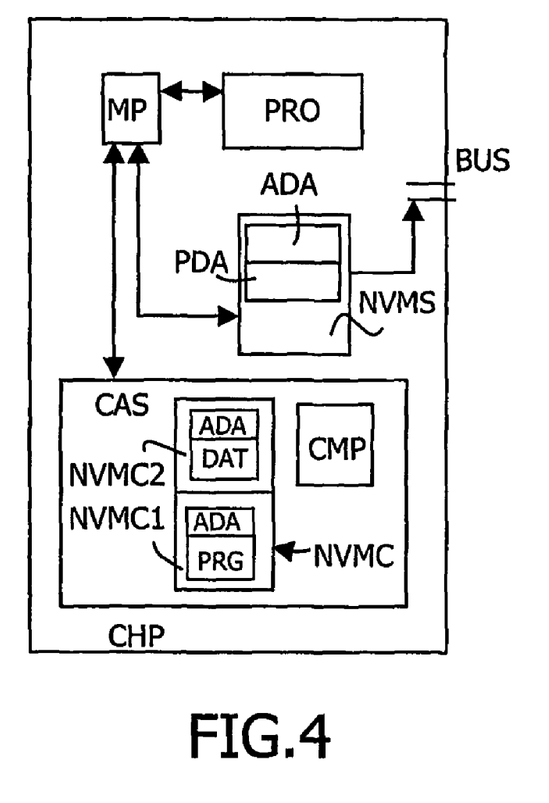
FIG. 4 illustrates a chip according to a preferred embodiment of the invention.

Protection data ADA according to the second embodiment can be used in order to protect a second kind of protected data PDA including program and data stored in the chip. For example, after a downloading of programs and data for a microprocessor, the invention further allows to control access to said downloaded programs and data. This is particularly advantageous for a chip wherein program and data dedicated to a conditional access system are downloaded in said chip itself. Effectively, thanks to the invention, a secured conditional access unit can be integrated on the chip itself. Effectively, according to a preferred embodiment of the invention as represented in FIG. 4, it is possible to have a conditional access unit CAS in the chip CHP itself. Effectively the invention allows having a protection in order to avoid the reading of program and data dedicated to a secured operation of a conditional access unit CAS. Such a feature is essential if one wishes to use a conditional access unit in the chip.

Generally, a conditional access system CAS includes a dedicated microprocessor CMP. Effectively the main microprocessor has a large program and data that cannot be efficiently secured. That is why, generally, another microprocessor is dedicated to this function. An example of such a microprocessor commonly used in a smart card system has the Intel 80c51 instruction set. This kind of microprocessor is advantageously implemented on the chip according to the invention. To program this microprocessor CMP, the broadcaster is free, according to the invention, to choose any programs it wants: algorithms used to decrypt the management messages (ECM and EMM messages for example), encryption algorithms and is then free to choose which security features it wants to implement in the conditional access unit CAS. The commonly used AES or Triple-Des algorithms to decrypt ECM messages, the commonly used RSA algorithm or elliptic curves with a system of public-private keys . . . can then be downloaded as long as downloading means are activated by feature data as presented above. Advanced features such as pay-per-view, parental control . . . can then be managed according to the downloaded program. An advantage of the invention is to render such choices possible without losing security as, once said algorithms are stored, protection data ADA according to the second embodiment of the invention gives the possibility to un-authorize access to said program and data in reading and/or writing by storing at least a limit value at address AD1 under which reading and/or writing is forbidden. Here, the control of access concerns accesses of a main microprocessor and not accesses of the conditional-access microprocessor that have to make any read and write accesses to the non-volatile memory where conditional-access program and data are stored. Effectively, at the lowest address one or more keys are stored and at the upper addresses the decrypted access rights are stored. Access rights give data to know for which programs the conditional-access microprocessor will accept to provide a descrambling key and the main microprocessor needs such data, it has consequently the right to read them. Then, the main microprocessor, thanks to an implementation of protection data ADA according to the second advantageous embodiment of the invention, can neither read nor write the lowest addresses and can read but cannot write the upper address where access rights are stored.

Advantageously, an additional internal SRAM memory is used for storing intermediate results during algorithm calculation. By construction, this last SRAM memory cannot be read or written by the main microprocessor, which means that there is no connection between this memory and the main microprocessor: this SRAM has a connection only with the conditional access microprocessor.

The preferred embodiment that can be used in combination or in juxtaposition with other embodiments according to the invention is particularly convenient for Set Top Box devices that advantageously have a conditional access system.

An example of a combination of the various embodiments shown presented hereinafter in the case of a Set Top Box device. In this example, as described in FIG. 4, the main chip CHP includes at least a microprocessor MP and a flash memory NVMS that can be partitioned. Said microprocessor MP is for example a processor having a MIPS instruction set. Advantageously, said flash memory NVMS is not connected directly to a microprocessor-bus but simple random logic is inserted between the microprocessor-bus and the flash memory in order to strongly secure the environment.

At the upper addresses of the flash memory NVMS are stored protection data ADA that can be grouped into three groups: Access_Control_Group, MIPS_Protection_Group and Selection_Options_Group The Access_Control_Group is constituted by the addresses AD1 presented in the following table.

| Address AD1 | Values | Name of protection data |
| --- | --- | --- |
| 1 bit | 0/1 | Selection_Options_ACCESS_CONTROL |
| 2 bits: | 0:0/0:1/1:X | MIPS_Protection_ACCESS_CONTROL |
| Y bits: | | SAVED_PASSWORD |

X is 0 or 1 and Y the number of bits in which the password SAVED_PASSWORD is coded.

According to the above embodiments, the protection data corresponding to MIPS_Protection_ACCESS_CONTROL either or not allows the access in writing to the MIPS_Protection_Group by the main microprocessor. Protected data of said MIPS_Protection_Group are defined in the table below:

| Address AD2 | Values | Name of protected data/feature |
| --- | --- | --- |
| 1 bit: | 0/1 | BOOT_MODE |
| 1 bit: | 0/1 | DISABLE_BUS |
| Z bits | | READ_ONLY |

Features attached to these protected data have been presented above. For example, the value of BOOT_MODE being 0, the boot can be used from an external memory, the value of BOOT_MODE being 1, the boot is realized from an internal non-volatile memory, for example, from the integrated non-volatile memory of the invention where a downloaded boot program has been stored.

Advantageously the non-volatile memory including said microprocessor program can be connected directly to the microprocessor, or simple random logic (also called glue logic) can be inserted between a microprocessor connection bus and the non-volatile memory in order to secure the connection.

Then, for example, the value of DISABLE_BUS being 0, a relevant connection bus could be used as connection means to test the chip or the final device and to charge any wanted program and data at will. Then, if the value of DISABLE_BUS is 1, said connection bus cannot be used anymore. The value of the protected data DISABLE_BUS is then not accessible anymore by changing the associated protection data ADA that is used according to the first embodiment of the invention. Any downloading and/or connection means can then be protected in such a way according to the invention.

The above protected data can be changed only if the non-volatile memory is in a non-protected mode according to the value stored at address AD1, which means, if the non-volatile memory is unprotected (MIPS_Protection_ACCESS_CONTROL=0:0) or if the non-volatile memory is protected by password (MIPS_Protection_ACCESS_CONTROL=0:1) with a valid password entered.

The protection data corresponding to Selection_Option ACCESS_CONTROL either or not allows the access in writing to the Selection_Options_Group by the main microprocessor. Protected data of said Selection_Options_Group are defined in the table below:

| Address AD2 | Values | Name of protected data/feature |
| --- | --- | --- |
| 1 bit: | 0/1 | ENABLE_SECAM |
| 1 bit: | 0/1 | ENABLE_MACROVISION |
| 1 bit: | 0/1 | ENABLE_ICAM |
| 1 bit: | 0/1 | ENABLE_CCIR_OUTPUT |

For example, the protection of the non-volatile memory (defined by MIPS_Protection_ACCESS_CONTROL) is here chosen to have no influence on this group. Only the value of Selection_Options ACCESS_CONTROL is considered.

The chip of the example also includes a programmable non-volatile memory NVMC or a part NVMC of a programmable non-volatile memory dedicated to a conditional access unit is implemented on the chip. Said non-volatile memory NVMC includes two parts NVMC1 and NVMC2 where the program and data for the functioning of the conditional access microprocessor CMP are stored respectively. Said part NVMC1 and NVMC2 includes protection data ADA according to the second embodiment of the invention at their highest addresses.

The invention also relates to a method to customize and protect a chip according to the invention. Said method uses a chip including at least an integrated non-volatile programmable memory, said non-volatile memory including protection data, said protection data at least defining a protection level for an access to said non-volatile memory, said protection data being programmable only to increase the protection level.

The first step is to use at least a non-protected access to modify data in said non-volatile memory, the second step being to protect the access to said data in non-volatile memory by increasing the protection level for said access by modifying protection data. As critical features can be protected according to the invention, a protected chip is then obtained by the method of the invention. Such a protected chip is advantageously intended to be implemented in a device dedicated to be connected to a media, including at least a microprocessor for processing data recovered from said media. For example said microprocessor controls coding/decoding means intended to process audio/video data.

Effectively, according to the invention, values of protection data may be changed and consequently the protection may be increased during the manufacturing process of the final protected chip. An example of a method to customize a chip is presented below. Said protection data can be implemented in one or several programmable non-volatile memories in the same chip.

A way to exploit the chip described in the above-proposed example of a chip is then presented in order to obtain a fully protected chip. An example of a chain of events using the two steps of the method in different circumstances is then presented below. A broadcaster that wishes to fabricate customized and secured final devices advantageously uses said chain of events on the chip itself or, even, on the chip implemented in said final device. The final device manufacturer or the broadcaster only needs means to program the chip to implement a method to obtain a protected chip according to the invention.

The chip is delivered unprotected to the final device manufacturer or to the broadcaster with a default boot mode from an external memory (BOOT_MODE=0). Any memory intended to become a non-volatile memory of the invention integrated on the chip is not yet protected and access to it is authorized. The final device manufacturer or broadcaster has then to carry out the following software manipulations:

Program the conditional access microprocessor CMP program PRG in a part NVMC1 of a non-volatile memory NVMC of the conditional access unit CAS. In this program all software for having a customized and complete conditional access system is included. For example, the broadcaster is free to choose which encryption algorithm (RSA or other) will be used for this purpose.

Protect this conditional access microprocessor CMP program by programming a protection data ADA that is a value at the highest address of part NVMC1 of said part NVMC1 of the non-volatile memory to forbid a main microprocessor MP to read or write the lowest addresses of this program. This protection of the non-volatile memory NVMC including conditional access program is realized according to the second embodiment. Said part NVMC1 is then a non-volatile memory NVM according to the principle of the invention as illustrated in FIG. 3.

Program the conditional access microprocessor CMP data DAT in a part NVMC2 of a non-volatile memory NVMC of the conditional access unit CAS. A deciphering key (RSA or other) is introduced in the lowest addresses allocated for these data.

Protect this part NVMC2 of the memory according to the invention by storing a protection data ADA at the highest addresses of said part NVMC2 in order to forbid the main microprocessor to read or write at the lowest addresses of said memory where the deciphering key is stored and also to forbid the main microprocessor to write at the addresses where the subscriber's rights are stored. This protection of the non-volatile memory including conditional access data is realized according to the second embodiment of said protection data. Said part NVMC2 is then a non-volatile memory NVM according to the principle of the invention as illustrated in FIG. 3.

Program a programmable non-volatile memory called secured memory NVMS, integrated on the chip by downloading from an external memory using the external boot mode. A connection BUS can realize said downloading. Depending on the size of the secured memory NVMS integrated on the chip, either the full program of the device, or only a small boot loader is stored at this memory NVMS. This boot loader can check at the startup of the device that the other pieces of the program, stored externally to the chip, have not been modified by a hack. In that purpose, it can implement a signature check of the external program such as for example the digital signature standard (DSS), ElGamal signature, Bos-Chaum signature, Lamport signature . . .

Set different feature data of the MIPS_Protection_Group at high addresses of said secured memory NVMC: boot from internal non-volatile memory (BOOT_MODE=1), deactivation of connection bus (DISABLE_BUS=1), restriction of the authorization in writing in said secured memory to protect the downloaded boot program (READ_ONLY=address limit).

Set different feature data of the Selection_Options_Group at high addresses of said secured memory NVMS: ENABLE_SECAM, ENABLE_MACROVISION, ENABLE_ICAM, ENABLE_CCIR_OUTPUT. As seen hereinabove, these options are then protected according to the first embodiment of the invention independently of the feature data of the MIPS_Protection_Group.

Protect said secured non-volatile memory NVMS by changing protection data Selection_Options_ACCESS_CONTROL and MIPS_Protection_ACCESS_CONTROL of the Access_Control_Group at the highest addresses of said secured memory NVMS. The password can be used to have a first security, for example, in the case where the final device manufacturer delivers the final device to the broadcaster with a password check (MIPS_Protection_ACCESS_CONTROL=0:1) for the broadcaster still to be able to activate a connection bus to test the final device.

Once protected, there is no longer a possibility to remove the protection from the chip. The decrease of said protection is no more possible.

With the invention, the chip manufacturer only knows the tools to create the conditional access system and to create the secured memory but neither the algorithms nor the keys have to be known from said chip manufacturer.

In case supplementary protection is needed, a smart card can also be implemented in relation with the main chip. Said smart card can be locked with the protected main chip by a public-private keys system.

A complete set of tools allowing several levels of protection and several combinations and juxtaposition of protection levels is then provided according to the invention. A single block of programmable non-volatile memory can provide one or several of the presented embodiments, implementations and applications in independent ways or in combination, as explained hereinabove. Then the invention meets the request of having protection means on the chip itself. Moreover, the invention goes further by proposing customizable protection means.

This is a supplementary security for the broadcaster and the final device manufacturer. This is also an advantage for the chip manufacturer, who does not have to introduce specific confidentiality procedures in his factories and along his logistic chain.

The invention claimed is:

1. A chip comprising:
a microprocessor; and
an integrated non-volatile programmable memory that stores protection data in a protection data memory portion and protected data in a protected data memory portion, wherein said protection data defines a protection level for authorizing or denying access to said protected data memory portion by said microprocessor while a program is executed; and
a one-way state machine having different states with different protection levels, said states being established via said protection data, wherein said protection data is modifiable only to increase said protection level by non-reversibly reducing access to a part of the protected data memory portion, and said protected data includes data to activate or deactivate an optional feature of the chip;

wherein said protection data further includes a value defining an address limit that characterizes addresses at which said protected data is located, wherein different kinds of protection are provided as a function of whether or not data to be accessed via a request is located within addresses defined by the address limit; and wherein said protected data includes programs and data operating a conditional-access dedicated microprocessor.

2. A chip according to claim 1, wherein said protection data includes a password, said access being authorized/denied through a password check.

3. A chip according to claim 1, wherein said optional feature is a connection to an external device for downloading a program and/or data from said external device.

4. A chip according to claim 1, wherein said protected data includes data to activate/deactivate an external boot program for said microprocessor, said external boot program including instructions for downloading a new boot program for said microprocessor from an external memory.

5. A chip according to claim 1, wherein said protection data includes at least one address value defining an address limit from which the data stored at said memory are protected data and access to such protected data is denied.

6. A device that recovers a content from a media and processes said content comprising:
   a connection to said media and a chip,
   the chip comprising:
   at least a microprocessor;
   an integrated non-volatile programmable memory that stores protection data in a protection data memory portion and protected data in a protected data memory portion, said protection data defining a protection level for authorizing or denying access to said protected data by said microprocessor while a program is executed; and
   a one-way state machine having different states with different protection levels, said states being established via said protection data, wherein said protection data is modifiable only to increase said protection level by non-reversibly reducing access to a part of the protected data memory portion, and wherein said protected data includes data to activate or deactivate an optional feature of the chip;
   wherein said protection data further includes a value defining an address limit that characterizes addresses at which said protected data is located, wherein different kinds of protection are provided as a function of whether or not data to be accessed via a request is located within addresses defined by the address limit; and
   wherein the first protected data portion comprises a set of conditional access microprocessor instructions and the first protection data portion comprises a first set of address data associated with the set of conditional access microprocessor instructions that is readable by the microprocessor.

7. A device as claimed in claim 6, wherein the device is intended to process encrypted video/audio data.

8. A method for protecting a chip comprising at least a microprocessor, said method comprising:
   using at least an authorized access to modify a first protected data portion in a first integrated non-volatile memory, and
   protecting, via a one-way state machine having different states with different protection levels, said states being established via protection data, access to said first protected data portion in said first integrated non-volatile memory by modifying a first protection data portion of the first integrated non-volatile memory in order to deny said access, wherein said protection data is modifiable only to increase said protection level by non-reversibly reducing access to a part of the first protected data memory portion, and said protected data includes data to activate or deactivate an optional feature of the chip;
   wherein said protection data further includes a value defining an address limit that characterizes addresses at which said protected data is located, wherein different kinds of protection are provided as a function of whether or not data to be accessed via a request is located within addresses defined by the address limit; and
   wherein the first protected data portion comprises a set of conditional access microprocessor instructions and the first protection data portion comprises a first set of address data associated with the set of conditional access microprocessor instructions that is readable by the microprocessor.

9. A chip according to claim 1 further comprising a random logic coupled between said integrated non-volatile programmable memory and a connection bus of said microprocessor.

10. A chip according to claim 1, wherein said microprocessor is a processor having a MIPS instruction set.

11. The method of claim 8 wherein the access to the part of the first protected data memory portion is non-reversibly reduced by modification of the first set of address data.

12. The method of claim 11 further comprising:
   using at least a second authorized access to modify a second protected data portion in the first integrated non-volatile memory, wherein the second protected data portion comprises a set of conditional access microprocessor data and a deciphering key, with the deciphering key allocated to a lowest address of the second protected data portion;
   protecting the access to the second protected data portion in the first integrated non-volatile memory by modifying a second protection data portion of the first integrated non-volatile memory in order to deny access to the second protected data portion, wherein said second protection data portion is modifiable only to increase said protection level by non-reversibly reducing access to at least a part of the second protected data memory portion.

13. The method of claim 12 wherein the second protection data portion comprises a second address data that is the lowest address in the second protected data portion readable by the microprocessor, wherein the set of address data is initially associated with the lowest address of the second protected data portion; and
   wherein the second protection data portion is modifiable only to increase said protection level by increasing the value of the second address data.

14. The method of claim 8 wherein said first data portion is protected via a password, said access being authorized/denied through a password check.

15. The method of claim 8 wherein said optional feature is a connection to an external device for downloading a program and/or data from said external device.

16. The method of claim 8 wherein said first protected data portion includes data to activate/deactivate an external boot program for said microprocessor, said external boot program including instructions for downloading a new boot program for said microprocessor from an external memory.

17. The method of claim 8 wherein said first protection data portion includes at least one address value defining an address limit from which the data stored at said memory are protected data and access to protected data is denied.

* * * * *